United States Patent
Choi et al.

(10) Patent No.: US 7,509,213 B2
(45) Date of Patent: Mar. 24, 2009

(54) APPARATUS AND METHOD FOR CORRECTING LOCATION INFORMATION OF MOBILE BODY, AND COMPUTER-READABLE MEDIA STORING COMPUTER PROGRAM FOR CONTROLLING THE APPARATUS

(75) Inventors: Kiwan Choi, Anyang-si (KR); Hyoungki Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 815 days.

(21) Appl. No.: 11/177,316

(22) Filed: Jul. 11, 2005

(65) Prior Publication Data

US 2006/0178815 A1    Aug. 10, 2006

(30) Foreign Application Priority Data

Feb. 4, 2005    (KR) ..................... 10-2005-0010617

(51) Int. Cl.
*G01C 21/00*    (2006.01)

(52) U.S. Cl. .................... 701/207; 701/200; 701/210; 701/300; 901/1; 901/46; 700/258; 318/568.12

(58) Field of Classification Search ............... 701/23, 701/200, 207, 210, 300; 901/1, 46, 47; 700/245, 700/258, 262; 706/905; 318/568.12, 587
See application file for complete search history.

(56) References Cited

U.S. PATENT DOCUMENTS

| | | | | |
|---|---|---|---|---|
| 4,679,152 A * | 7/1987 | Perdue | ................... | 701/23 |
| 6,246,468 B1 * | 6/2001 | Dimsdale | ................... | 356/4.02 |
| 6,389,329 B1 * | 5/2002 | Colens | ................... | 700/262 |
| 6,532,404 B2 * | 3/2003 | Colens | ................... | 700/262 |
| 6,781,338 B2 * | 8/2004 | Jones et al. | ................... | 318/567 |
| 6,847,462 B1 * | 1/2005 | Kacyra et al. | ................... | 356/601 |
| 7,095,022 B2 * | 8/2006 | Nakasuji et al. | ................... | 250/310 |
| 2004/0066376 A1 * | 4/2004 | Donath et al. | ................... | 345/169 |

* cited by examiner

*Primary Examiner*—Gertrude Arthur Jeanglaud
(74) *Attorney, Agent, or Firm*—Staas & Halsey LLP

(57) ABSTRACT

There is provided an apparatus and method for correcting location information of a mobile body and a computer-readable recording medium storing at least a computer program for controlling the apparatus. The apparatus for correcting the location information of the mobile body, the location information regarding at least one of a location and an azimuth angle of the mobile body, includes a beam generator generating at least one beam; and a location information correcting unit receiving measured location information, sensing the generated beam, and correcting the received measured location information using the sensed beam, wherein the location information correcting unit is installed in the mobile body. Therefore, it is possible to easily correct location information of a mobile body using beams and more accurately correct the location information without accumulating errors, differently from a conventional dead reckoning system. Also, it is possible to correct the location information without an artificial landmark, even at night, or when no lighting exists, since the location information is corrected using an infrared ray, and to more accurately correct the location information of a mobile body by increasing the number of the beams. Further, it is possible to flexibly provide a trade-off between the number of the beams and accuracy in correcting of the location information, and to allow the mobile body to sense beams and accurately correct its location information, when the mobile body is picked up and moved to a different location. Therefore, it is possible to accurately correct at least one of a location and an azimuth angle measured by the dead reckoning system, for example, in a home robot having a home base.

26 Claims, 12 Drawing Sheets

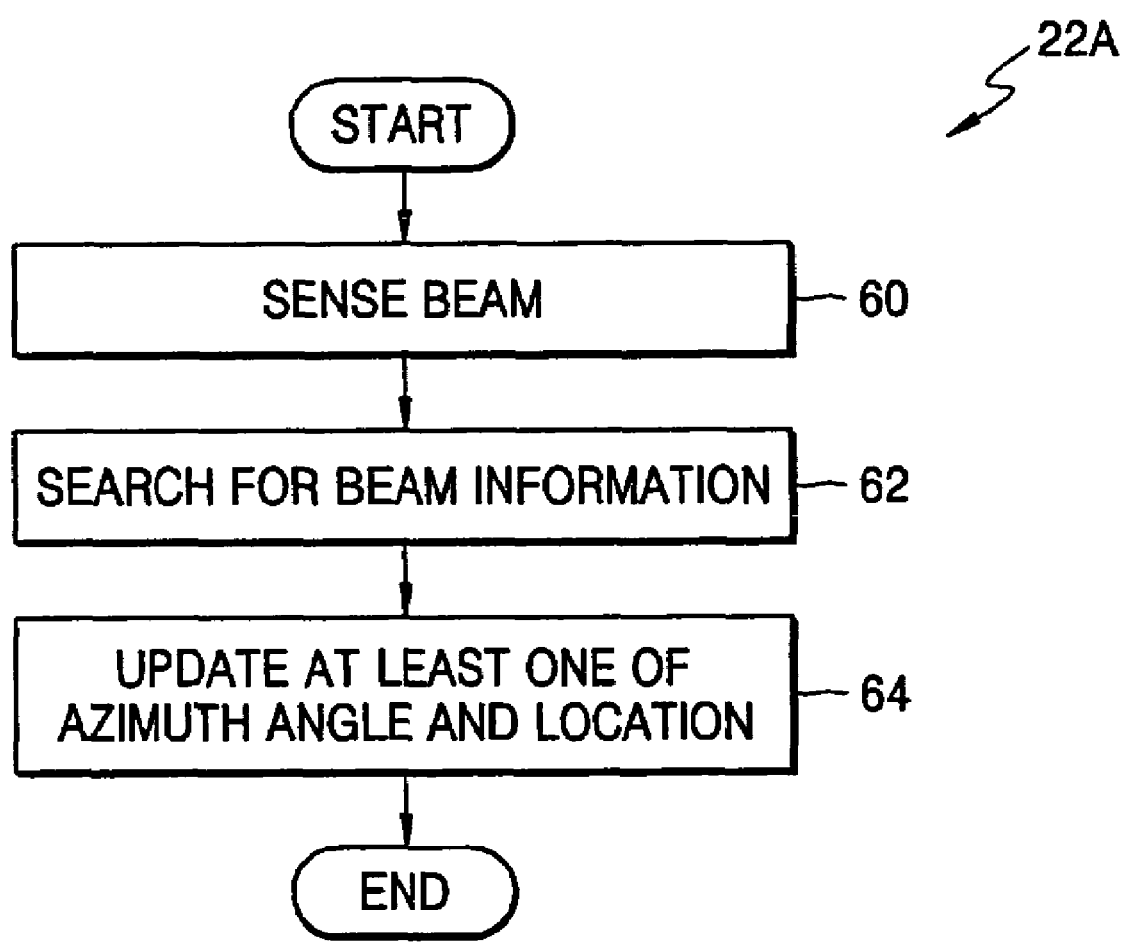

APPARATUS AND METHOD FOR CORRECTING LOCATION INFORMATION OF MOBILE BODY, AND COMPUTER-READABLE MEDIA STORING COMPUTER PROGRAM FOR CONTROLLING THE APPARATUS

CROSS REFERENCE TO RELATED APPLICATION

This application claims the benefit of Korean Patent Application No. 2005-10617, filed on Feb. 4, 2005, in the Korean Intellectual Property Office, the disclosure of which is incorporated herein in its entirety by reference.

BACKGROUND OF THE INVENTION

1. Field of the Invention

The present invention relates to the control of a mobile body, such as a security robot having a home base, a helper robot, or a cleaning robot, and more particularly, to an apparatus and method for correcting location information of a mobile body, and a computer-readable media storing a computer program for controlling the apparatus.

2. Description of the Related Art

In conventional methods for controlling a mobile body, it is impossible to accurately detect the location of the mobile body. One of such conventional methods is disclosed in U.S. Pat. No. 6,532,404 entitled "Mobile Robots and their Control System." This conventional method has a problem in that it is impossible to detect the location of a robot although it is possible to make the robot return to a home base. Another conventional method is disclosed in U.S. Pat. No. 6,781,338 B2 entitled "Method and System for Robot Localization and Confinement." This conventional method also has a problem in that it is impossible to detect the location of a robot although it is possible to set a range within which the robot moves. A conventional method capable of approximately detecting the location of a robot is disclosed in Korean Patent Application No. 2003-0000597 entitled "Auto Charge Return Apparatus and Method of Robot Cleaner." In this conventional method, a robot can receive an infrared ray only when the robot faces a charger and approximately sense the location of the charger, but cannot accurately know its location.

Meanwhile, there is a dead reckoning system among the conventional methods in which the moving distances of left and right wheels of a robot are individually measured and a location and an azimuth angle of the robot are measured using the individually measured distances. A conventional dead reckoning system is disclosed in the introductory part of the paper by J. Borenstein, IEEE International Conference on Robotics and Automation, San Diego, Calif., May 8-13, 1994, entitled "The CLAPPER: A Dual-drive Mobile Robot With Internal Correction of Dead-Reckoning Errors." However, since the dead reckoning system has a problem of accumulating errors of the location and azimuth angle of the robot, a limitation exists in detecting the location and azimuth angle of the robot using only this system.

SUMMARY OF THE INVENTION

Additional aspects and/or advantages of the invention will be set forth in part in the description which follows and, in part, will be apparent from the description, or may be learned by practice of the invention.

The present invention provides an apparatus and method for correcting location information of a mobile body. The apparatus and method are capable of easily and accurately correcting the location information, the location information being at least one of a location and an azimuth angle of a mobile body, without being greatly influenced by external conditions.

The present invention also provides a computer-readable media storing a computer program for controlling the apparatus for correcting the location information of the mobile body.

According to an aspect of the present invention, there is provided an apparatus for correcting location information of a mobile body, the location information being at least one of a location and an azimuth angle of the mobile body, the apparatus including: a beam generator generating at least one beam; and a location information correcting unit receiving measured location information, sensing the generated beam, and correcting the received measured location information using the sensed beam, where the location information correcting unit is installed in the mobile body.

According to another aspect of the present invention, there is provided a method for correcting location information of a mobile body, the location information regarding at least one of a location and an azimuth angle of the mobile body, including: generating at least one beam; and sensing the generated beam and correcting measured given location information using the sensed beam, where the sensing of the beam is performed by the mobile body.

According to still another aspect of the present invention, there is provided a computer-readable recording medium storing at least a computer program for controlling an apparatus for correcting location information of a mobile body, the location information regarding at least one of a location and an azimuth angle of the mobile body, the computer program performing: generating at least one beam; and sensing the generated beam and correcting measured given location information using the sensed beam, where the sensing of the beam is performed by the mobile body.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart illustrating operation 22 shown in FIG. 2 according to an embodiment of the present invention;

DETAILED DESCRIPTION OF THE PREFERRED EMBODIMENTS

Hereinafter, an apparatus and method for correcting location information of a mobile body, according to embodiments of the present invention, will be described with reference to the appended drawings.

Figure 2:
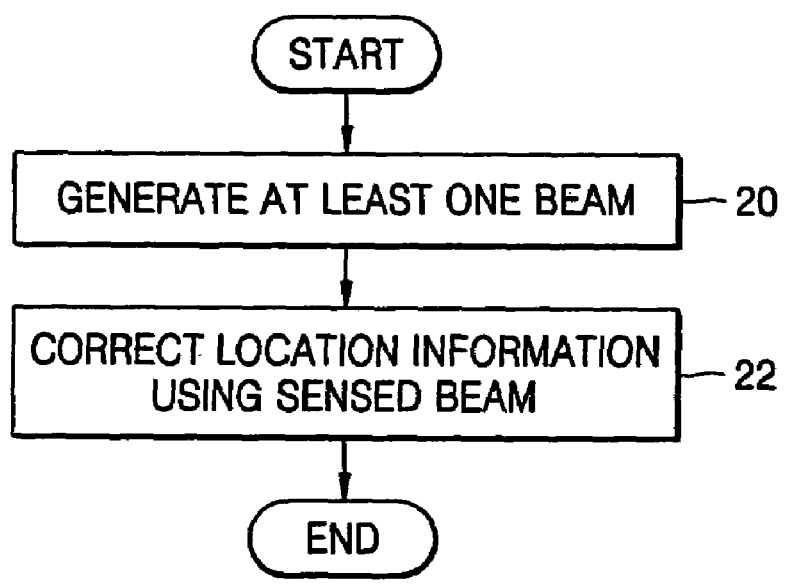
FIG. 2 is a flowchart illustrating a method for correcting location information of a mobile body according to the present invention.

FIG. 2 is a flowchart illustrating a method for correcting location information of a mobile body, according to the present invention, where the location information correcting method includes: generating a beam (operation 20); and correcting location information using the beam (operation 22).

Figure 1:
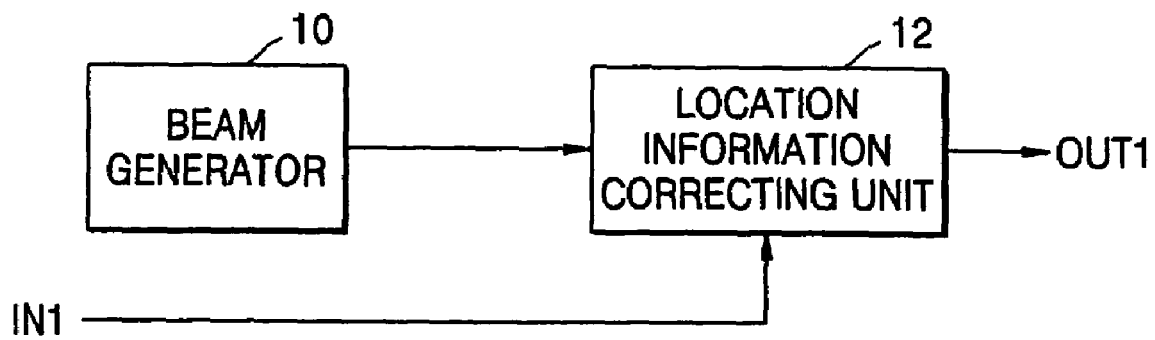
FIG. 1 is a block diagram of an apparatus for correcting location information of a mobile body according to the present invention.

Referring to FIGS. 1 and 2, the location information is corrected as follows. Here, the location information means at least one of a location and an azimuth angle of the mobile body.

The location and azimuth angle of the mobile body to be corrected by the location information correcting apparatus and method according to the present invention can be measured by a dead reckoning system. That is, at least one of the location and azimuth angle of the mobile body is measured as location information by the dead reckoning system, and the measured location information is corrected by the location information correcting apparatus and method according to the present invention.

First, the beam generator 10 generates at least one beam (operation 20). Here, the beam generator 10 corresponds to a conventional home base and can generate an infrared ray as the beam. If the mobile body is a robot, the home base may be a place for charging the robot, and also can be defined as a location where the robot returns after performing its functions.

After operation 20, the location information correcting unit 12 senses the beam generated by the beam generator 10, corrects location information using the sensed beam, receives measured location information through an input terminal IN1, updates the received measured location information to the corrected location information, and outputs the updated result through an output terminal OUT1 (operation 22). For performing operation 22, the location information correcting unit 12 which senses a beam is installed in the mobile body.

Figure 3:
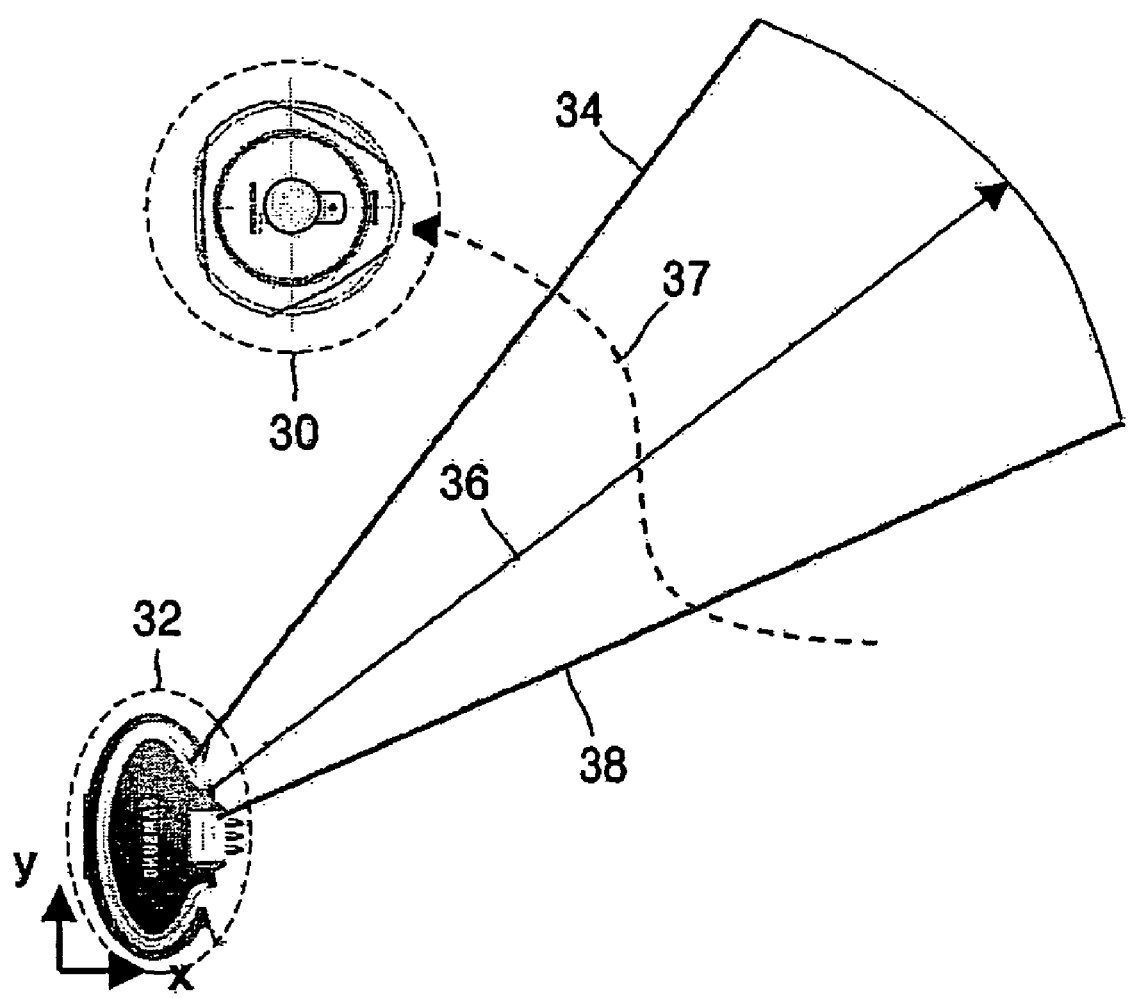
FIG. 3 is a plane view illustrating the location information correcting apparatus shown in FIG. 1.

FIG. 3 is a plane view illustrating the location information correcting apparatus shown in FIG. 1, where the location information correcting apparatus includes a beam generator 32 and a mobile body 30 including the location information correcting unit 12. The beam generator 32 shown in FIG. 3 corresponds to the beam generator 10 shown in FIG. 1. Here, x and y are world coordinates.

Referring to FIG. 3, the mobile body 30 sequentially senses beams 38, 36, and 34 generated by the beam generator 32 while traveling in an arrow direction 37, and corrects its location information whenever sensing the beams 38, 36, and 34.

Figure 4:
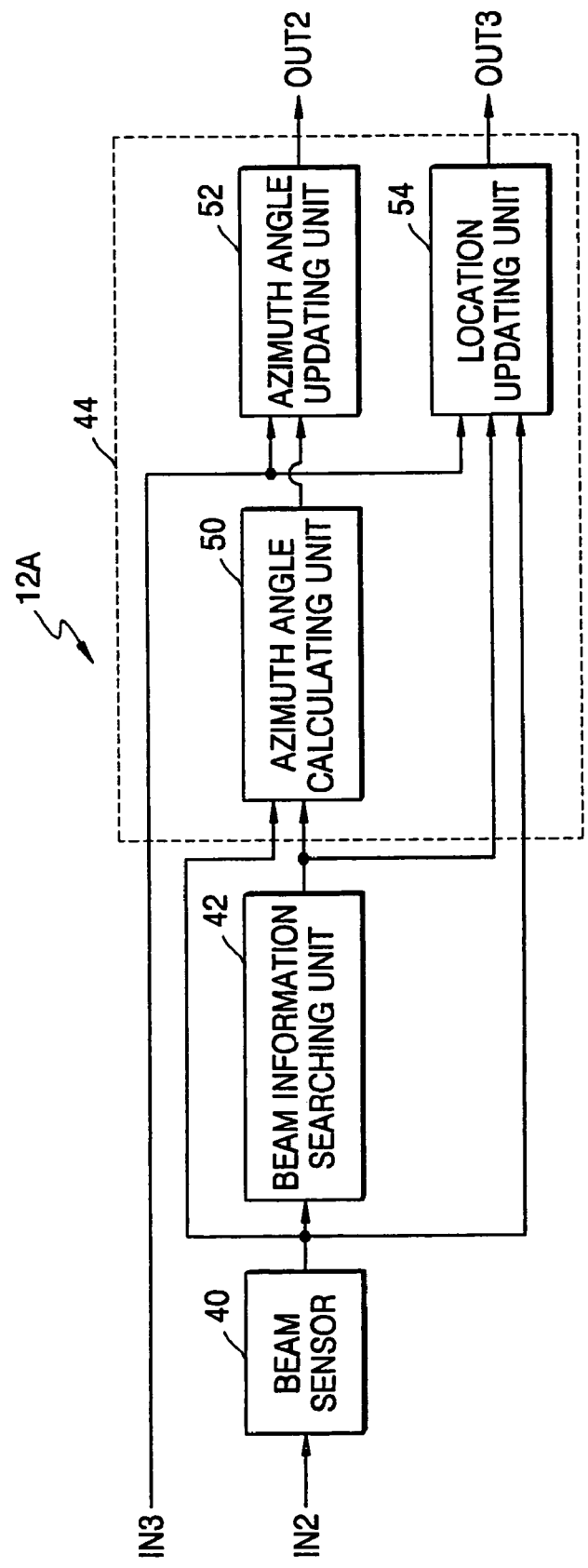
FIG. 4 is a block diagram of a location information correcting unit shown in FIG. 1, according to an embodiment of the present invention.

FIG. 4 is a block diagram of the location information correcting unit 12 shown in FIG. 1, according to an embodiment 12A of the present invention, where the location information correcting unit 12A includes a beam sensor 40, a beam information searching unit 42, and a location information updating unit 44.

FIG. 5 is a flowchart illustrating operation 22 shown in FIG. 2, according to an embodiment 22A of the present invention, where operation 22A includes: sensing a beam (operation 60); searching for beam information (operation 62); and updating location information (operation 64).

The beam sensor 40 of the location information correcting unit 12A shown in FIG. 4 senses a beam received through an input terminal IN2, and outputs the sensed beam to the beam information searching unit 42 (operation 60).

Figure 6A:
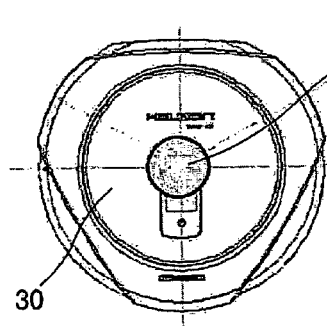
FIGS. 6A and 6B are views illustrating the exterior of a mobile body including the beam sensor shown in FIG. 4.
Figure 6B:
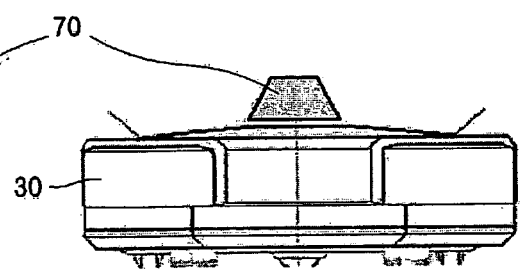

FIGS. 6A and 6B illustrate the exterior of a mobile body 30 including the beam sensor 40 shown in FIG. 4. FIGS. 6A and 6B are a plan view and a side view of a main body 30 in which a beam sensor 70 is installed, respectively.

As shown in FIGS. 6A and 6B, the beam sensor 70 can be disposed in the center of the mobile body 30. The beam sensor 70 can be implemented by an Omni lens (not shown) and a two-dimensional PSD (Position Sensitive Detector) (not shown). Here, the Omni lens can sense beams in all directions. The two-dimensional PSD creates an image of a beam sensed by the Omni lens and outputs coordinates of the created image.

Figure 7:
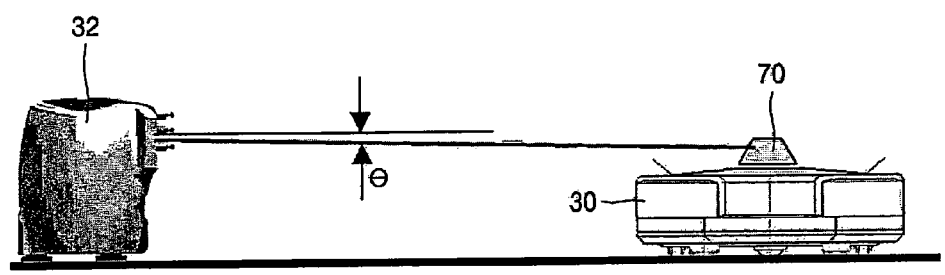
FIG. 7 is a side view of the location information correcting apparatus shown in FIG. 1.

FIG. 7 is a side view of the location information correcting apparatus shown in FIG. 1, where the location information correcting apparatus includes the beam generator 32 and the mobile body 30. The mobile body 30 includes the location information correcting unit 12 in which the beam sensor 70 is installed.

As shown in FIG. 7, the beam generator 32 outputs a generated beam to an angle θ downward from a horizontal direction. Accordingly, it is possible to sense beams generated from the beam generator 32 even when the mobile body 30 is low in height.

Figure 8A:
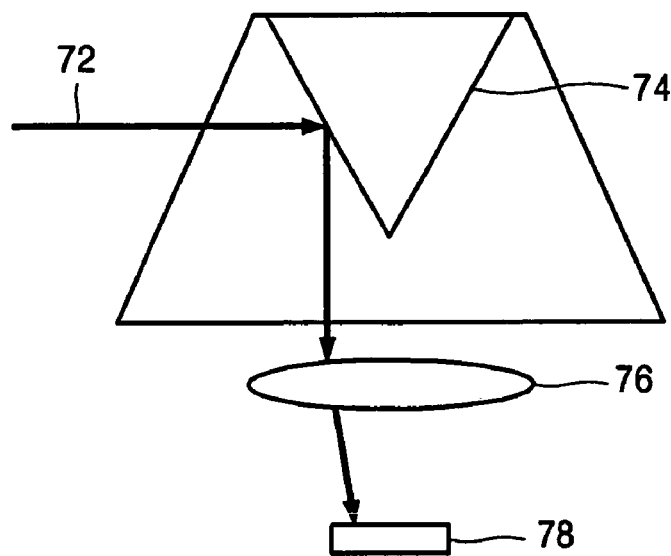
FIGS. 8A and 8B are views schematically showing the exterior of the beam sensor shown in FIG. 4.
Figure 8B:
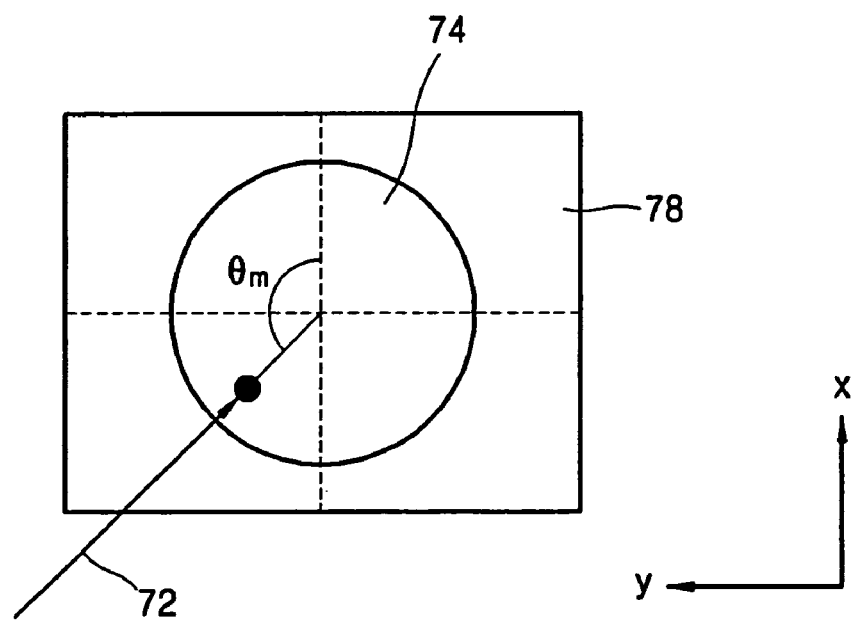

FIGS. 8A and 8B are views schematically showing the exterior of the beam sensor 40 shown in FIG. 4, where FIG. 8A is a side view of the beam sensor 40 and FIG. 8B is a plan view of a two-dimensional PSD 78. In FIG. 8B, x and y are world coordinates.

A beam 72 generated from the beam generator 10 is reflected by the Omni lens 74 of the beam sensing unit 40 shown in FIG. 8A, then passes through a scale correcting lens 76, and forms an image on the two-dimensional PSD 78. Coordinates for the formed image are output from the PSD 78. If a mobile body stands facing to the x-axis direction of the world coordinates, an angle formed by the x-axis and the beam 72 is θm as shown in FIG. 8B.

After operation 60, the beam information searching unit 42 detects the frequency of a beam sensed by the beam sensor 40, searches for beam information corresponding to the detected frequency from pre-stored beam information, and outputs the searched beam information to the location information updating unit 44 (operation 62).

Referring to FIG. 3, since the beams 34, 36 and 38 generated from the beam generator 32 are linear, each of the beams 34, 36 and 38 can be expressed by equation 1.

$$y = ax + b, \quad (1)$$

where, a represents a slope of a beam generated from the beam generator 32, that is, a beam sensed by the beam sensor 40, and b represents an intercept on the y-axis of the beam. Here, a and b of a beam generated by the beam generator 32 are different according to those of a different beam generated from the beam generator 32. Thus, since beams generated from the beam generator 32 are different in frequency from each other, when the beam information searching unit 42 detects the frequency of a beam sensed by the beam sensor 40, the beam information searching unit 42 can search for a and/or b of the beam corresponding to the detected frequency. For that, the beam information searching unit 42 in advance stores beam information, that is, a and/or b for each of the frequencies of beams.

After operation 62, the location information updating unit 44 receives at least one (that is, measured location information) of a measured location and a measured azimuthal angle through an input terminal IN3, and updates the received measured location information on the basis of corrected location information obtained using the beam information searched by the beam information searching unit 42, and outputs the updated result (operation 64).

According to an embodiment of the present invention, to perform operation 64, the location information updating unit 44 can be implemented by only an azimuth angle calculating unit 50 and an azimuth angle updating unit 52, differently from the configuration shown in FIG. 4.

The azimuth angle calculating unit 50 calculates an azimuth angle of a mobile body, using an angle formed by the mobile body and a beam sensed by the beam sensor 40 and the slope of the beam sensed by the beam sensor 40, and outputs the calculated azimuth angle to the azimuth angle updating unit 52.

Figure 9:
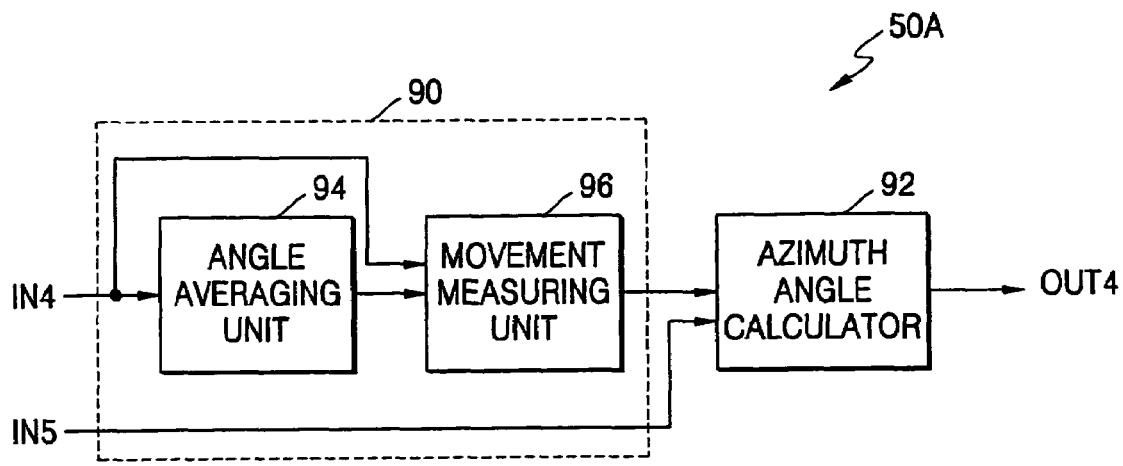
FIG. 9 is a block diagram of an azimuth angle calculating unit shown in FIG. 4 according to an embodiment of the present invention.

FIG. 9 is a block diagram of the azimuth angle calculating unit 50 shown in FIG. 4, according to an embodiment 50A of the present invention, where the azimuth angle calculating unit 50A includes an angle measuring unit 90 and an azimuth angle calculator 92.

Figure 10:
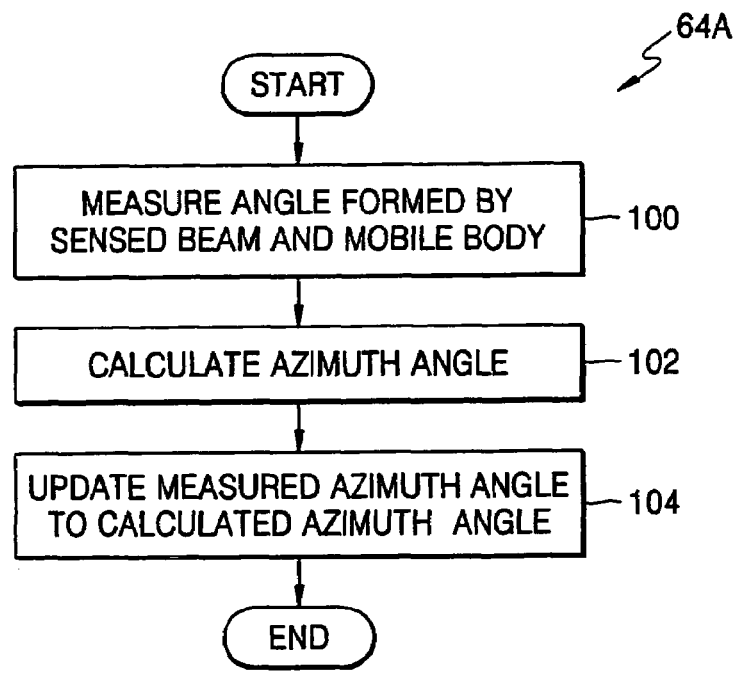
FIG. 10 is a flowchart illustrating operation 64 shown in FIG. 5 according to an embodiment of the present invention.

FIG. 10 is a flowchart illustrating operation 64 shown in FIG. 5, according to an embodiment 64A of the present invention, where operation 64A includes: measuring an angle (operation 100); calculating an azimuth angle (operation 102); and updating the azimuth angle (operation 104).

After operation 62, the angle measuring unit 90 measures the angle formed by the mobile body and the sensed beam received from the beam sensor 40 through an input terminal IN4, and outputs the measured angle to the azimuth angle calculator 92 (operation 100).

Figure 11:
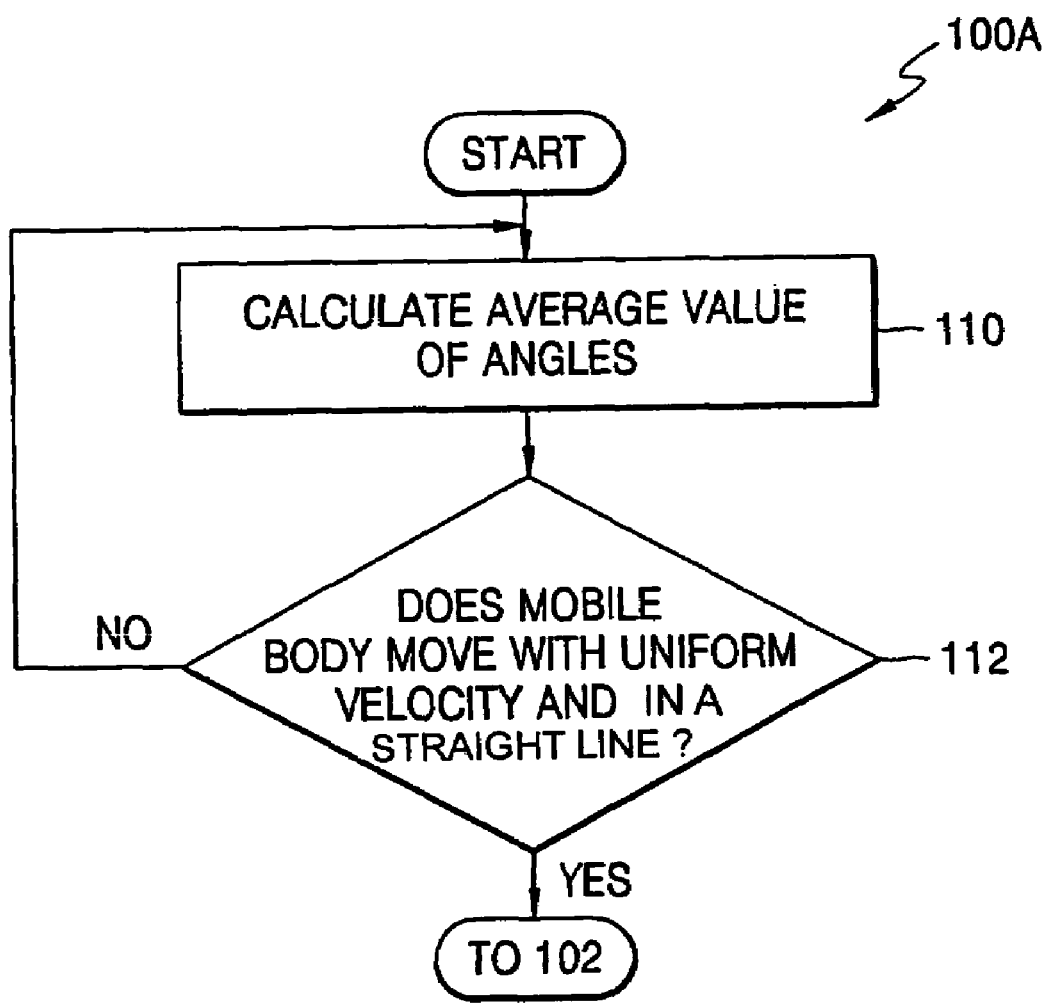
FIG. 11 is a flowchart illustrating operation 100 shown in FIG. 10 according to an embodiment of the present invention.

FIG. 11 is a flowchart illustrating operation 100 shown in FIG. 10, according to an embodiment 100A of the present invention, where the operation 100A includes: calculating an average value of angles (operation 110); and measuring the movement of the mobile body (operation 112).

According to the present invention, as shown in FIG. 9, the angle measuring unit 90 can be implemented by an angle averaging unit 94 and a movement measuring unit 96.

After operation 62, the angle averaging unit 94 calculates an average value of an angle formed by a beam initially sensed (that is, sensed at a time $t_i$) by the beam sensor 40 and the mobile body, and an angle formed by a beam finally sensed (that is, sensed at a time $t_f$) by the beam sensor 40 and the mobile body, and outputs the calculated average value to the movement measuring unit 96 (operation 110). To perform operation 110, the angle averaging unit 94 receives a beam initially sensed by the beam sensor 40 and a beam finally sensed by the beam sensor 40 through the input terminal IN4 from the beam sensor 40. That is, an angle measured by the angle measuring unit 90 and output to the azimuth angle calculator 92, corresponds to an angle formed by the mobile body and a beam sensed at an intermediate time $t_c$ of the initial time $t_i$ and the final time $t_f$.

After operation 110, the movement measuring unit 96 receives the beams sensed at the times $t_i$ and $t_f$ through the input terminal IN4 from the beam sensor 40, determines whether the mobile body travels with uniform velocity and in a straight line using the received beams, and outputs an average value calculated by the angle averaging unit 94 as a measured angle to the azimuth angle calculator 92 in response to the determined result (operation 112). For example, the movement measuring unit 96 determines whether or not the mobile body travels with uniform velocity and in a straight line, using the results sensed by the beam sensor 40 (operation 112). If the mobile body travels with uniform velocity and in a straight line, the movement measuring unit 96 bypasses the calculated average value received from the angle averaging unit 94 as a measured angle to the azimuth angle calculator 92.

Meanwhile, after operation 100, the azimuth angle calculator 92 calculates an azimuth angle θr, according to the following equation 2, using the slope a of a sensed beam received through an input terminal IN5 from the beam information searching unit 42 and a measured angle θm received from the angle measuring unit 90, and outputs the calculated azimuth angle θr to the azimuth angle updating unit 52 through an output terminal OUT4 (operation 102).

$$\theta_r = (180° - \theta_m) + \theta_h, \tag{2}$$

where $\theta_h$ represents arctan(a).

Figure 12:
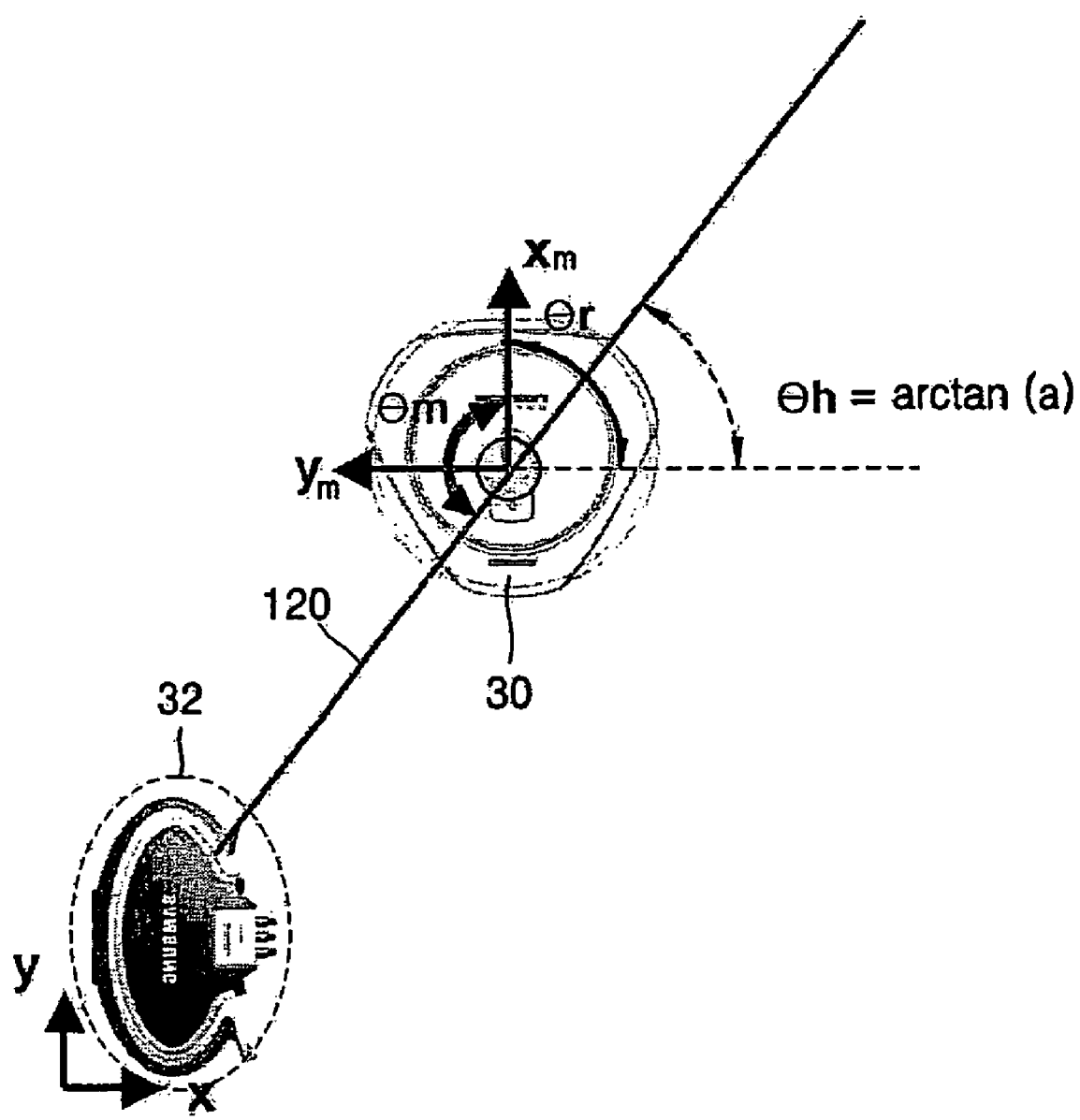
FIG. 12 is a view for explaining the location information correcting unit shown in FIG. 4.

FIG. 12 is a view for explaining the location information correcting unit 12A shown in FIG. 4, where the location information correcting unit 12A includes a mobile body 30 and a beam generator 32. Here, $x_m$ and $y_m$ represent the axes of a coordinate system of a mobile body, for example, a robot coordinate system.

Referring to FIG. 12, a beam sensor 40 of the mobile body 30 senses a beam 120 generated from the beam generator 32 and outputs the sensed beam to the beam information searching unit 42. Then, the beam information searching unit 42 analyzes the frequency of the sensed beam 120 and searches for beam information corresponding to the analyzed frequency from pre-stored beam information. That is, the beam information searching unit 42 searches for a slope a of the sensed beam 120 as beam information. Meanwhile, an angle measuring unit 90 of an azimuth angle calculating unit 50A measures an angle θr formed by the sensed beam 120 and the mobile body 30, and outputs the measured angle θr to the azimuth angle calculator 92. An angle averaging unit 94 of the angle measuring unit 90 measures the angle θm shown in FIG. 12.

Figure 13A:
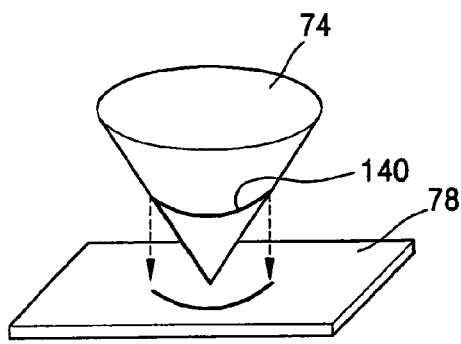
FIGS. 13A through 13D are views for explaining the angle averaging unit shown in FIG. 9.
Figure 13B:
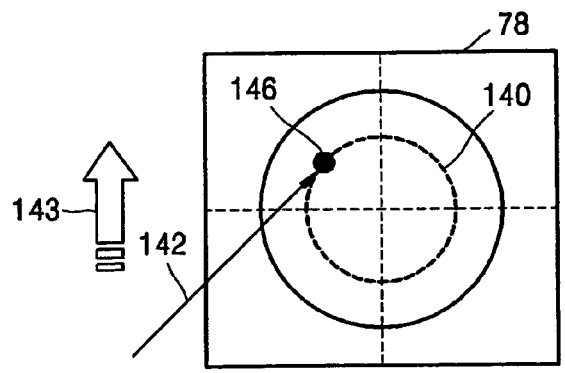
Figure 13C:
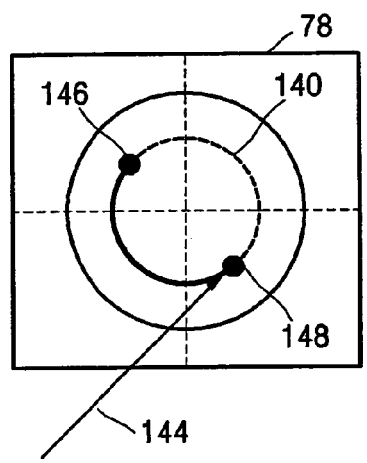
Figure 13D:
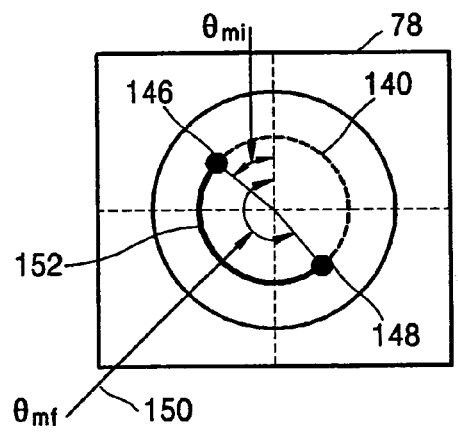

FIGS. 13A through 13D are views for explaining the angle averaging unit 94 shown in FIG. 9, where FIG. 13A illustrates the exterior of a beam sensor 40 for sensing a beam, including an Omni Lens 74 and a PSD 78, FIG. 13B is a view illustrating an image 146 which a beam 142 reflected along a beam sensing line 140 on the side portion of the Omni lens 74 forms on the PSD 78, FIG. 13C is a view illustrating an image 148 which a beam 144 reflected along a beam sensing line 140 on the side portion of the Omni lens 74 forms on the PSD 78, and FIG. 13D is a view illustrating the formed images 146 and 148 and a circular arc 152.

As shown in FIG. 13A, the beam 142 sensed at an initial time $t_i$ along a certain line 140 on the side portion of the Omni lens 74 forms an image 146 on the PSD 78 as shown in FIG.

13B. At this time, if the mobile body 30 travels in an arrow direction 143, the beam 144 sensed at a final time $t_f$ along a certain line 140 on the side portion of the Omni lens 74 forms an image 148 on the PSD 178 as shown in FIG. 13C.

As a result, as shown in FIG. 13D, if the mobile body travels with uniform velocity and in a straight line in the arrow direction 143, the images 146 and 148 formed on PSD 78 form a circular arc 152. Accordingly, when a beam 150 passes through the center of the PSD 78 at a time $t_c$ (that is, at an intermediate time $t_c$ of the initial time $t_i$ and the final time $t_f$) corresponding to the intermediate point of the circular arc 152, the angle averaging unit 94 can calculate an angle θm using Equation 3.

$$\theta_m = \frac{(\theta_{mi} + \theta_{mf})}{2}, \qquad (3)$$

where, $\theta_{mi}$ represents an angle measured at the time $t_i$ and $\theta_{mf}$ represents an angle measured at the time $t_f$.

Meanwhile, after operation 102, the azimuth angle updating unit 52 updates a measured azimuth angle of a mobile body received through the input terminal IN3 to an azimuth angle calculated by the azimuth angle calculating unit 50, and outputs the updated azimuth angle through an output terminal OUT2 (operation 104).

According to another embodiment of the present invention, to perform operation 64, the location information updating unit 44 can be implemented by only a location updating unit 54 unlike the embodiment shown in FIG. 4.

Figure 14:
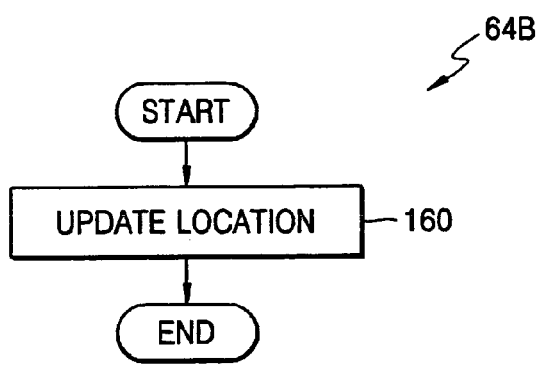
FIG. 14 is a flowchart illustrating operation 64 shown in FIG. 5 according to an embodiment of the present invention.

FIG. 14 is a flowchart illustrating operation 64 shown in FIG. 5, according to an embodiment 64B of the present invention, where operation 64B includes updating a location (operation 160).

After operation 62, the location updating unit 54 calculates a corrected location using beam information searched by the beam information searching unit 42, receives a measured location of the mobile body through the input terminal IN3, updates the measured location to the calculated corrected location, and outputs the updated location through an output terminal OUT3 (operation 160).

Figure 15A:
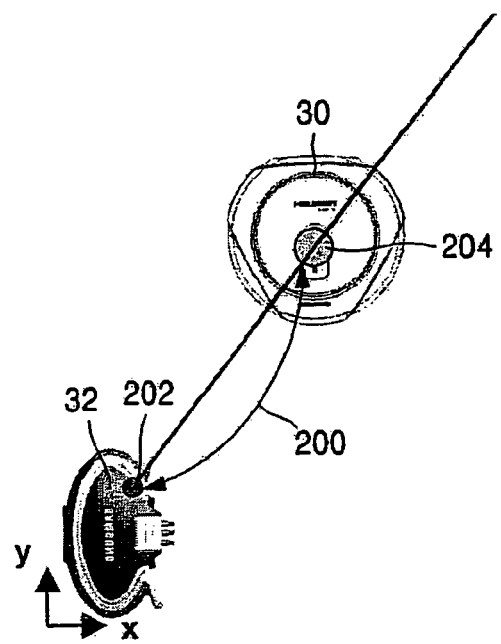
FIGS. 15A through 15C are views for explaining a location updating unit according to an embodiment of the present invention.
Figure 15B:
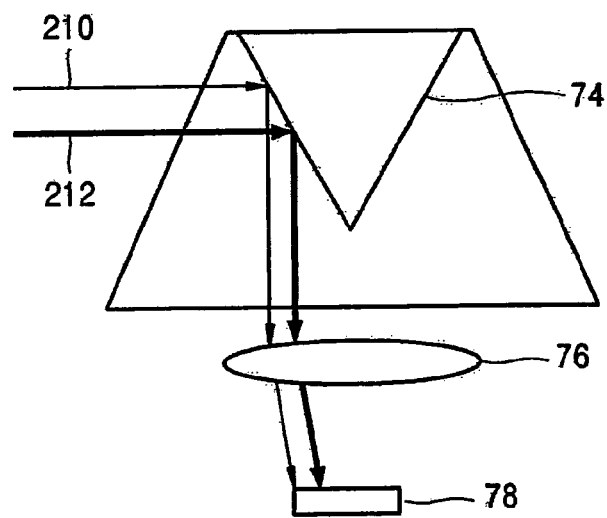
Figure 15C:
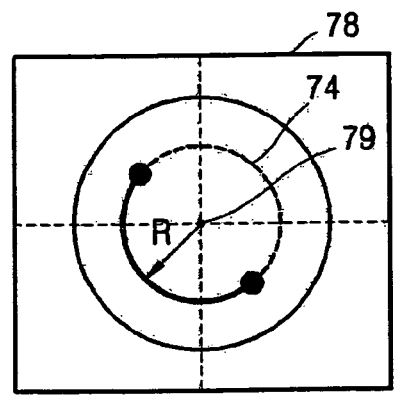

FIGS. 15A through 15C are views for explaining the location updating unit 54 according to an embodiment of the present invention, where FIG. 15A is a plan view of a location information correcting apparatus, FIG. 15B is a view showing the exterior of the beam sensor 40, and FIG. 15C is a view showing the exterior of the PSD 78. Here, x and y are world coordinates.

According to an embodiment of the present invention, the location updating unit 54 can calculate a corrected location using Equations 4 and 5.

$$y_{tc} = ax_{tc} + b \qquad (4)$$

$$(x_{tc} - x_p)^2 + (y_{tc} - y_p)^2 = L^2 = (kR)^2 \qquad (5)$$

Referring to FIGS. 15A through 15C, $x_{tc}$ represents the x-axis coordinate of a corrected location of the mobile body 30 at the time $t_c$ and $y_{tc}$ represents the y-axis coordinate of the corrected location of the mobile body 30 at the time $t_c$. That is, $x_{tc}$ and $y_{tc}$ respectively represent the x- and y-axis coordinates of a corrected location 204 of the mobile body 30 shown in FIG. 15A.

Here, a and b represent beam information corresponding to a detected frequency, searched by the beam information searching unit 42, and $x_p$ and $y_p$ represent the x- and y-axis coordinates of a beam generating location 202 of the beam generator 32 shown in FIG. 15A, respectively. Here, k is a scale factor, and R is a distance from the center 79 of the beam sensor 78 to a location at which a beam is sensed, as shown in FIG. 15C. Referring to FIG. 15B, the R formed by a beam 210 generated from a beam generator 32 located adjacent to the mobile body 30 is larger than R formed by a beam 212 generated from a beam generator 32 located at an equal distance from the mobile body 30. Accordingly, as seen in Equation 5, a distance (L) 200 between the mobile body 30 and the beam generator 32 can be expressed by k and R.

As a result, a and b in Equation 4 are beam information searched by the beam information searching unit 42, $x_p$ and $y_p$ in Equation 5 are information provided in advance to the location updating unit 54 of the mobile body 30, and R is a value which the location updating unit 54 measures using a beam sensed by the beam sensor 40. Accordingly, a corrected location ($x_{tc}$ and $y_{tc}$) of the mobile body 30 can be obtained according to Equations 4 and 5 using the values a, b, $x_p$, $y_p$, and R.

Figure 16:
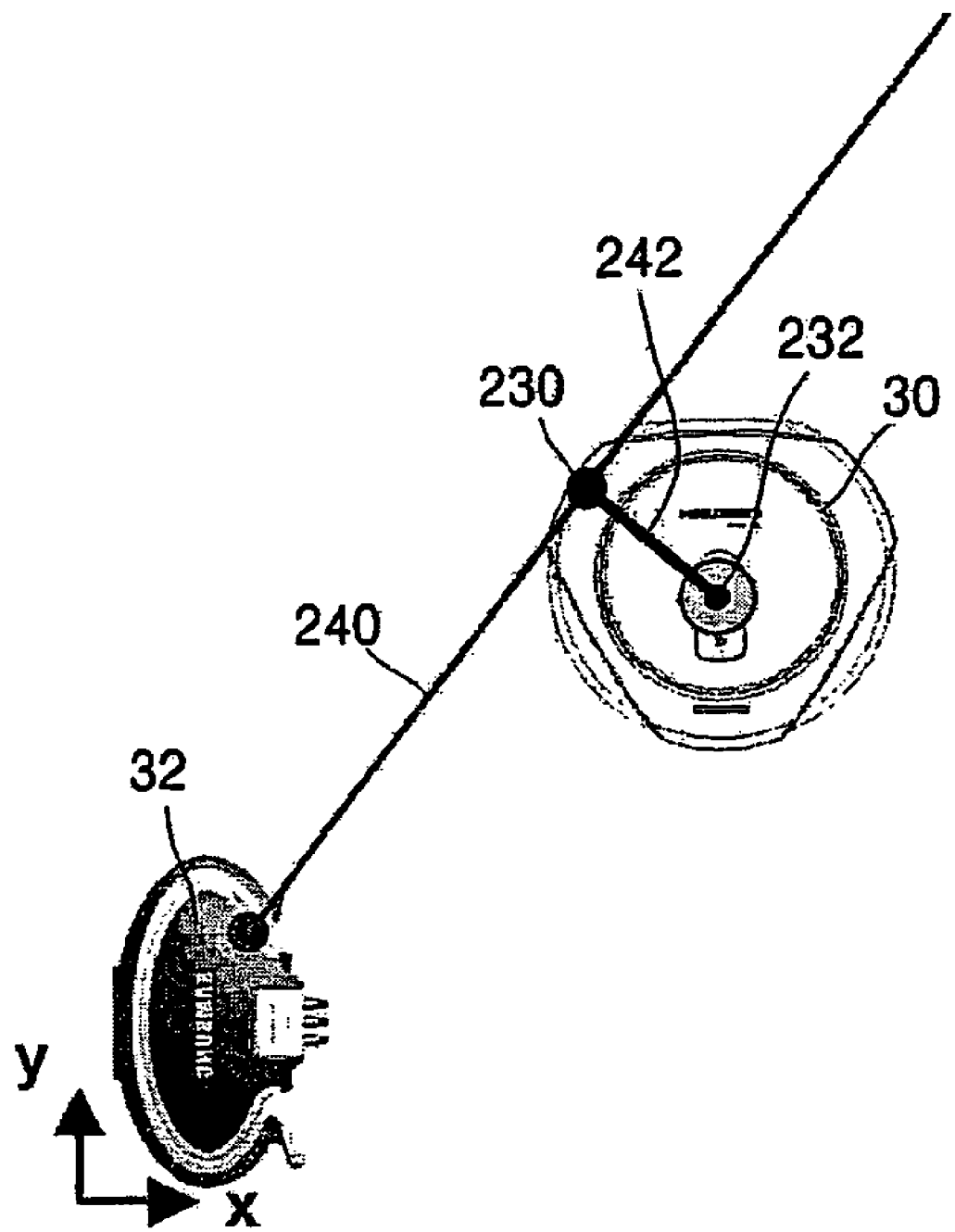
FIG. 16 is a view for explaining a location updating unit according to another embodiment of the present invention.

FIG. 16 is a view for explaining a location updating unit 54 according to another embodiment of the present invention, where the location updating unit 54 includes a mobile body 30 and a beam generator 32.

According to another embodiment of the present invention, the location updating unit 54 can calculate a corrected location using Equations 6 and 7.

$$y'_{tc} = a' x'_{tc} + b' \qquad (6)$$

$$y'_{tc} = -\frac{1}{a'}(x'_{tc} - x''_{tc}) + y''_{tc} \qquad (7)$$

Referring to FIG. 16, $x'_{tc}$ represents the x-axis coordinate of the corrected location of the mobile body 30 at a time $t_c$ and $y'_{tc}$ represents the y-axis coordinate of the corrected location of the mobile body 30 at the time $t_c$. That is, $x'_{tc}$ and $y'_{tc}$ represent the x- and y-axis coordinates of the corrected location 230 of the mobile body 30 shown in FIG. 16, respectively. The reference character a' represents a slope of a beam 240, a' and b' represent beam information corresponding to a detected frequency searched by the beam information searching unit 42, $x''_{tc}$ represents the x-axis coordinate of a measured location of the mobile body 30, and $y''_{tc}$ represents the y-axis coordinate of the measured location of the mobile body 30. That is, $x''_{tc}$ and $y''_{tc}$ represent the x- and y-axis coordinates of a measured location 232 of the mobile body 30 shown in FIG. 16, respectively.

As a result, a' and b' in Equation 6 are beam information searched by the beam information searching unit 42, and $x''_{tc}$ and $y''_{tc}$ in Equation 7 are information measured by the dead reckoning system, etc. and received through the input terminal IN3 to the location updating unit 54 from an external source, as described above. Accordingly, the corrected location ($x'_{tc}$ and $y'_{tc}$) of the mobile body 30 can be obtained according to Equations 6 and 7 using the values a', b', $x''_{tc}$ and $y''_{tc}$. That is, Equation 6 represents a straight line drawn on a world coordinates by the beam 240 and Equation 7 represents a line 242 orthogonal to the beam 240.

According to another embodiment of the present invention, to perform operation 64, the location information updating unit 44 can be implemented by an azimuth angle calculating unit 50, an azimuth angle updating unit 52, and a location updating unit 54, as shown in FIG. 4. In this case, operation 64A shown in FIG. 10 and operation 64B shown in FIG. 14 can be simultaneously performed. Alternately, it is also possible that operation 64A is performed prior to operation 64B or operation 64B is performed prior to operation 64A.

The above-described embodiments of the present invention can also be embodied as programs capable of being executed by a computer and can be implemented by general digital computers executing the programs using a computer readable recording medium. Examples of the computer readable recording medium include magnetic storage devices (for example, read-only memories (ROMs), floppy disks, hard disks, etc.), optical storage devices (for example, CD-ROMs, DVDs, etc.), and carrier waves (for example, transmission through the Internet).

Hereinafter, a computer-readable recording medium storing a computer program for controlling the apparatus for correcting the location information of the mobile body, according to the present invention, will be described as follows.

The computer-readable recording medium storing at least one computer program controlling the location information correcting apparatus for correcting location information which is information regarding at least one of a measured location and an azimuth angle of the mobile body, stores a computer program performing: generating at least one beam; sensing the generated beam; and correcting location information using the sensed beam. The correcting of the location information includes: sensing a beam; detecting a frequency of the sensed beam; searching for beam information corresponding to the detected frequency from pre-stored beam information; updating at least one of a measured location and a measured azimuth angle to a corrected location and a corrected azimuth angle obtained using the searched beam information.

Here, the updating of the at least one of the measured location and the measured azimuth angle includes: calculating an azimuth angle of the mobile body, using an angle formed by the sensed beam and the mobile body and a slope of the sensed beam; and updating the measured azimuth angle of the mobile body to the calculated azimuth angle, where the slope of the sensed beam is included in the searched beam information. The calculating of the azimuth angle includes: measuring the angle formed by the sensed beam and the mobile body; and calculating the azimuth angle using the slope of the sensed beam and the measured angle according to Equation 2. The measuring of the angle includes: calculating an average value of an angle formed by a beam initially sensed and the mobile body and an angle formed by a beam finally sensed and the mobile body; and determining whether the mobile body travels with uniform velocity and in a straight line, where, if the mobile body travels with uniform velocity and in a straight line, the azimuth angle is calculated using the calculated average value as a measured angle and the measured angle corresponds to an angle formed by a beam sensed at an intermediate time of the initial time and the final time and the mobile body. The updating includes: updating a measured location of the mobile body to a location calculated using searched beam information.

As a result, whenever the mobile body passes through a beam generated from the beam generator 10, that is, whenever the mobile body senses a beam, the location information correcting unit 12 can correct measured location information of the mobile body, that is, at least one of a measured location and a measured azimuth angle of the mobile body. Therefore, the measured location information of the mobile body can be corrected more accurately as the number of beams generated from the beam generator 10 increases.

For example, when it is assumed that the mobile body is a robot, the beam generator 10 generates beam of infrared rays, the robot travels within a living room and a kitchen of a 132 m² apartment, the robot detects at least one infrared ray whenever traveling the distance of 5 m, and the number of the infrared rays is more than or equal to 2. Table 1 is provided for comparing the present invention with the conventional dead reckoning system.

TABLE 1

|  | Location error | Azimuth angle error | Remarks |
| --- | --- | --- | --- |
| Performances according to the conventional technique after traveling the distance of 16 m (no tuning) | Average 16 cm | Average 45° |  |
| Performances according to the conventional technique after traveling the distance of 16 m (tuning) | Average 3.5 cm | Average 0.8° |  |
| Predicted performances according to the present invention (no tuning) | Within 6 cm | Within 2° | When a beam is detected once per 5 m |
| Predicted performances according to the present invention (tuning) | Within 2 cm | Within 1° | When a beam is detected once per 5 m |

Here, 'no tuning' means a state in which the values of the distance between the wheels, the diameter of the wheel, etc. of the mobile body are not finely adjusted, and 'tuning' means a state in which the values of the distance between the wheels, the diameter of the wheel, etc. of the mobile body are finely adjusted.

As seen in Table 1, the present invention leads to smaller errors in location and azimuth angle, than the conventional dead reckoning system.

As described above, in the apparatus and method for correcting location information of a mobile body and the computer-readable recording medium storing a computer program controlling the apparatus, according to the present invention, it is possible to easily correct location information of a mobile body using beams and more accurately correct the location information without accumulating errors, differently from a conventional dead reckoning system in which errors of location information are accumulated. Also, it is possible to correct the location information without an artificial landmark, even at night, or when no lighting exists, since the location information is corrected using an infrared ray, and to more accurately correct the location information of a mobile body by increasing the number of the beams. Further, it is possible to flexibly provide a trade-off between the number of the beams and accuracy in correcting the location information, and to allow the mobile body to sense beams and accurately correct its location information when the mobile body is picked up and moved to a different location. Therefore, the present invention can be used to accurately correct at least one of a location and an azimuth angle measured by the dead reckoning system, for example, in a home robot having a home base, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for correcting location information of a mobile body, the location information being at least one of a location and an azimuth angle of the mobile body, the apparatus comprising:
   a beam generator generating at least one beam; and
   a location information correcting unit receiving measured location information, sensing the generated beam, and correcting the received measured location information using the sensed beam,
   wherein the location information correcting unit is installed in the mobile body.

2. The apparatus of claim 1, wherein the location information correcting unit comprises:
   a beam sensor sensing the beam and outputting the sensed beam;
   a beam information searching unit detecting a frequency of the sensed beam and searching for beam information corresponding to the detected frequency from pre-stored beam information; and
   a location information updating unit updating at least one of the measured location and the measured azimuth angle to a corrected location and a corrected azimuth angle obtained using the searched beam information, respectively.

3. The apparatus of claim 2, wherein the location information updating unit comprises:
   an azimuth angle calculating unit calculating the azimuth angle of the mobile body using an angle formed by the sensed beam and the mobile body and a slope of the sensed beam; and
   an azimuth angle updating unit updating the measured azimuth angle of the mobile body to the calculated azimuth angle,
   wherein the slope of the sensed beam is included in the searched beam information.

4. The apparatus of claim 3, wherein the azimuth angle calculating unit comprises:
   an angle measuring unit measuring an angle formed by the sensed beam and the mobile body; and
   an azimuth angle calculator calculating the azimuth angle using the slope of the sensed beam and the measured angle, according to the following equation:

$\theta_r = (180° - \theta_m) + \theta_h$, where $\theta_r$ represents the calculated azimuth angle, $\theta_m$ represents an angle measured by the angle measuring unit, $\theta_h$ represents arctan (a), and a is an angle corresponding to the slope of the sensed beam.

5. The apparatus of claim 4, wherein the angle measuring unit comprises:
   an angle averaging unit calculating an average value of an angle formed by the beam sensed at an initial time and the mobile body and an angle formed by the beam sensed at a final time and the mobile body; and
   a movement measuring unit determining whether the mobile body travels with uniform velocity and in a straight line and outputting the calculated average value as the measured angle to the azimuth angle calculator in response to the determined result,
   wherein the angle measured by the angle measuring unit corresponds to an angle formed by a beam sensed at an intermediate time between the initial time and the final time and the mobile body.

6. The apparatus of claim 2, wherein the location information updating unit comprises a location updating unit updating the measured location of the mobile body to a corrected location calculated using the searched beam information.

7. The apparatus of claim 3, wherein the location information updating unit further comprises a location updating unit updating the measured location of the mobile body to a corrected location calculated using the searched beam information.

8. The apparatus of claim 6, wherein the location updating unit calculates the corrected location using the following equations:

$y_{tc} = ax_{tc} + b$, and $(x_{tc} - x_p)^2 + (y_{tc} - y_p)^2 = L^2 = (kR)^2$, where $t_c$ is a time at which the beam sensor senses the beam, $x_{tc}$ represents an x-axis coordinate of the corrected location at the time $t_c$, $y_{tc}$ represents a y-axis coordinate of the corrected location at the time $t_c$, a represents a slope of the beam, a and b are the beam information corresponding to the detected frequency, $x_p$ and $y_p$ represent x- and y-axis coordinates of the beam generator, respectively, k represents a scale factor, and R represents a distance from a center of the beam sensor to a location at which the beam is sensed.

9. The apparatus of claim 6, wherein the location updating unit calculates the corrected location using the following equations:

$y'_{tc} = a' x'_{tc} + b'$, and $y'_{tc} = -\dfrac{1}{a'}(x'_{tc} - x''_{tc}) + y''_{tc}$, where $t_c$ is a time at which the beam sensor senses the beam, $x'_{tc}$ represents an x-axis coordinate of the corrected location at the time $t_c$, $y'_{tc}$ represents a y-axis coordinate of the corrected location at the time $t_c$, a' represents a slope of the beam, a' and b' are the beam information corresponding to the detected frequency, $x'_{tc}$ represents an x-axis coordinate of the measured location of the mobile body, and $y''_{tc}$ represents a y-axis coordinate of the measured location of the mobile body.

10. The apparatus of claim 1, wherein the location and the azimuth angle of the mobile body are measured by a dead reckoning system.

11. The apparatus of claim 1, wherein the beam generator generates the beam of infrared ray.

12. A method for correcting location information of a mobile body, the location information regarding at least one of a location and an azimuth angle of the mobile body, comprising:
    generating at least one beam; and
    sensing the generated beam and correcting measured given location information using the sensed beam,
    wherein the sensing of the beam is performed by the mobile body.

13. The method of claim 12, wherein the correcting of the measured location information comprises:
   sensing the beam;
   detecting a frequency of the sensed beam and searching for beam information corresponding to the detected frequency from pre-stored beam information; and
   updating at least one of the measured location and the measured azimuth angle to a corrected location and a corrected azimuth angle obtained using the searched beam information, respectively.

14. The method of claim 13, wherein the updating of the at least one of the measured location and the measure azimuth angle comprises:
   calculating the azimuth angle of the mobile body using an angle formed by the sensed beam and the mobile body and a slope of the sensed beam; and
   updating the measured azimuth angle of the mobile body to the calculated azimuth angle,
   wherein the slope of the sensed beam is included in the searched beam information.

15. The method of claim 14, wherein the calculating of the azimuth angle comprises:
   measuring an angle formed by the sensed beam and the mobile body; and
   calculating the azimuth angle using a slope of the sensed beam and the measured angle according to the following Equation:

$\theta_r = (180° - \theta_m) + \theta_h,$ where $\theta_r$ represents the calculated azimuth angle, $\theta_m$ represents a measured angle $\theta_h$ represents arctan (a), and a is an angle corresponding to the slope of the sensed beam.

16. The method of claim 15, wherein the measuring of the angle comprises:
   calculating an average value of an angle formed by the beam sensed at an initial time and the mobile body and an angle formed by the beam sensed at a final time and the mobile body; and
   determining whether the mobile body travels with uniform velocity and in a straight line,
   wherein, if the mobile body travels with uniform velocity and in a straight line, the azimuth angle is calculated using the calculated average value as the measured angle and the measured angle corresponds to an angle formed by a beam sensed at an intermediate time of the initial time and the final time and the mobile body.

17. The method of claim 13, wherein the updating comprises:
   updating the measured location of the mobile body to a corrected location calculated using the searched beam information.

18. The method of claim 14, wherein the updating of the at least one of the measured location and the measured azimuth angle further comprises:
   updating the measured location of the mobile body to a corrected location calculated using the searched beam information.

19. A computer-readable recording medium storing at least a computer program for controlling an apparatus for correcting location information of a mobile body, the location information regarding at least one of a location and an azimuth angle of the mobile body, the computer program performing:
   generating at least one beam; and
   sensing the generated beam and correcting measured given location information using the sensed beam,
   wherein the sensing of the beam is performed by the mobile body.

20. The computer-readable recording medium of claim 19, wherein the correcting of the location information comprises:
   sensing the beam;
   detecting a frequency of the sensed beam and searching for beam information corresponding to the detected frequency from pre-stored beam information; and
   updating at least one of the measured location and the measured azimuth angle to a corrected location and a corrected azimuth angle calculated using the searched beam information, respectively.

21. The computer-readable recording medium of claim 20, wherein the updating of the at least one of the measured location and the measured azimuth angle comprises:
   calculating the azimuth angle of the mobile body using an angle formed by the sensed beam and the mobile body and a slope of the sensed beam; and
   updating the measured azimuth angle of the mobile body to the calculated azimuth angle,
   wherein the slope of the sensed beam is included in the searched beam information.

22. The computer-readable recording medium of claim 21, wherein the calculating of the azimuth angle comprises:
   measuring an angle formed by the sensed beam and the mobile body;
   calculating the azimuth angle using the slope of the sensed beam and the measured angle, according to the following Equation:

$\theta_r = (180° - \theta_m) + \theta_h,$ where $\theta_r$ represents the calculated azimuth angle, $\theta_m$ represents the measured angle, $\theta_h$ represents arctan (a), and a is an angle corresponding to the slope of the sensed beam.

23. The computer-readable recording medium of claim 22, wherein the calculating of the angle comprises:
   calculating an average value of an angle formed by a beam sensed at an initial time and the mobile body and an angle formed by a beam sensed at a final time and the mobile body;
   determining whether the mobile body travels with uniform velocity and in a straight line; and
   if the mobile body travels with uniform velocity and in a straight line, calculating the azimuth angle using the calculated average value as the measured angle,
   wherein the measured angle corresponds to an angle formed by a beam sensed at an intermediate time between the initial time and the final time and the mobile body.

24. The computer-readable recording medium of claim 20, wherein, in the updating, the measured location of the mobile body is updated to a corrected location calculated using the searched beam information.

25. The computer-readable recording medium of claim 21, wherein the updating of the at least one of the measured location and the measured azimuth angle further comprises:
   updating the measured location of the mobile body to a corrected location calculated using the searched beam information.

26. The computer-readable recording medium of claim 21, wherein the beam is an infrared ray.

* * * * *

UNITED STATES PATENT AND TRADEMARK OFFICE
CERTIFICATE OF CORRECTION

PATENT NO. : 7,509,213 B2 Page 1 of 1
APPLICATION NO. : 11/177316
DATED : March 24, 2009
INVENTOR(S) : Kiwan Choi et al.

It is certified that error appears in the above-identified patent and that said Letters Patent is hereby corrected as shown below:

Column 12, Line 52, change "$x'_{tc}$" to --$x''_{tc}$--.

Signed and Sealed this

Second Day of June, 2009

JOHN DOLL
*Acting Director of the United States Patent and Trademark Office*